US012646446B2

(12) United States Patent
Jeong et al.

(10) Patent No.: US 12,646,446 B2
(45) Date of Patent: Jun. 2, 2026

(54) SCAN DRIVING CIRCUIT AND DISPLAY DEVICE

(71) Applicant: Samsung Display Co., Ltd., Yongin-si (KR)

(72) Inventors: Keuk-Jin Jeong, Yongin-si (KR); Wongyun Kim, Yongin-si (KR); Min Kang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/926,699

(22) Filed: Oct. 25, 2024

(65) Prior Publication Data

US 2025/0218349 A1 Jul. 3, 2025

(30) Foreign Application Priority Data

Jan. 3, 2024 (KR) ........................ 10-2024-0000804

(51) Int. Cl.
*G09G 3/32* (2016.01)

(52) U.S. Cl.
CPC ....... *G09G 3/32* (2013.01); *G09G 2310/0267* (2013.01); *G09G 2310/08* (2013.01)

(58) Field of Classification Search
CPC ................... G09G 3/32; G09G 3/3233; G09G 2310/0286; G09G 2310/08; G09G 2310/0267; G09G 3/30; G09G 3/3266; G09G 2300/0809; G09G 2300/0426; G11C 19/28
See application file for complete search history.

(56) References Cited

U.S. PATENT DOCUMENTS

| | | | | |
|---|---|---|---|---|
| 2011/0273421 | A1 | 11/2011 | Chung | |
| 2014/0375616 | A1 | 12/2014 | Kim et al. | |
| 2015/0379935 | A1 | 12/2015 | Choi | |
| 2019/0347996 | A1 | 11/2019 | Zhu et al. | |
| 2021/0103179 | A1* | 4/2021 | Kim | G02F 1/13454 |
| 2022/0310006 | A1 | 9/2022 | Yu et al. | |
| 2023/0169926 | A1* | 6/2023 | Kim | G09G 3/3266 345/213 |
| 2023/0351972 | A1* | 11/2023 | In | G09G 3/3233 |

FOREIGN PATENT DOCUMENTS

| | | | |
|---|---|---|---|
| KR | 100970269 | B1 | 7/2010 |
| KR | 1020180067105 | A | 6/2018 |
| KR | 1020220074700 | A | 6/2022 |
| KR | 1020220095921 | A | 7/2022 |

* cited by examiner

*Primary Examiner* — Muhammad N Edun

(74) *Attorney, Agent, or Firm* — CANTOR COLBURN LLP

(57) ABSTRACT

A scan driving circuit includes: an input part connected to a first voltage terminal, a second voltage terminal, and a carry input terminal and for outputting a second signal to a second node; a controller, which controls a first signal of a first node and the second signal of the second node; and a fifth transistor configured to be controlled by the first signal of the first node and for delivering a second clock signal to an output terminal.

21 Claims, 18 Drawing Sheets

SCAN DRIVING CIRCUIT AND DISPLAY DEVICE

This application claims priority to Korean Patent Application No. 10-2024-0000804, filed on Jan. 3, 2024, and all the benefits accruing therefrom under 35 U.S.C. § 119, the content of which in its entirety is herein incorporated by reference.

BACKGROUND

Embodiments of the present disclosure described herein relate to a display device, and more particularly, relate to a display device including a scan driving circuit.

A display device includes pixels connected to data lines and scan lines. Each of the pixels includes a light emitting element and a pixel circuit for controlling the light emitting element. The pixel circuit may provide a current corresponding to a data signal to the light emitting element. At this time, light having predetermined luminance may be generated in response to a current flowing through the light emitting element.

A scan driving circuit outputs scan signals to sequentially drive the scan lines.

SUMMARY

Embodiments of the present disclosure provide a scan driving circuit capable of minimizing a circuit area and a display device including the same.

According to an embodiment, a scan driving circuit includes: an input part connected to a first voltage terminal, a second voltage terminal, and a carry input terminal and outputting a second signal to a second node, a controller that controls a first signal of a first node and the second signal of the second node, and a fifth transistor configured to be controlled by the first signal of the first node and delivering a second clock signal to an output terminal.

In an embodiment, the input part may include a first transistor connected between the first voltage terminal and a third node, and including a gate electrode connected to a first clock input terminal, a second transistor connected between the second voltage terminal and the second node, and including a gate electrode connected to the carry input terminal, and a third transistor connected between the third node and the second node and including a gate electrode connected to the carry input terminal.

In an embodiment, the second transistor and the third transistor may be transistors having different types from each other.

In an embodiment, a first clock signal provided to the first clock input terminal and the second clock signal provided to a second clock input terminal may have frequencies the same as each other and different phases from each other.

In an embodiment, during a first period, each of a carry signal provided to the carry input terminal and the first clock signal is at a first level, and the second clock signal may be at a second level different from the first level. During a second period different from the first period, the second clock signal may be at the first level. During the second period, a scan signal output to the output terminal may be at the first level the same as the second clock signal.

In an embodiment, the controller may include a fourth transistor connected between the first node and the second node and including a gate electrode connected to the second voltage terminal.

In an embodiment, a first voltage provided to the first voltage terminal may have a higher voltage level than a second voltage provided to the second voltage terminal.

According to an embodiment, a scan driving circuit may include a first transistor connected between a first voltage terminal and a third node, and including a gate electrode connected to a first clock input terminal, a second transistor connected between a second voltage terminal and a second node and including a gate electrode connected to a carry input terminal, a third transistor connected between the third node and the second node and including a gate electrode connected to the carry input terminal, a fourth transistor connected between the second node and a first node and including a gate electrode connected to the second voltage terminal, a fifth transistor connected between an output terminal and a second clock input terminal and including a gate electrode connected to the first node, a first capacitor connected between the output terminal and the first node, and a second capacitor connected between the first node and the second voltage terminal.

In an embodiment, a second signal of the second node may be determined by turning on one of the second transistor and the third transistor by a carry signal provided to the carry input terminal.

In an embodiment, the second transistor and the third transistor may be transistors having different types from each other.

In an embodiment, a first clock signal provided to the first clock input terminal and a second clock signal provided to the second clock input terminal may have frequencies the same as each other and different phases from each other.

In an embodiment, during a first period, each of a carry signal provided to the carry input terminal and the first clock signal may be at a first level. During a second period different from the first period, the second clock signal may be at the first level. During the second period, a scan signal output to the output terminal may be at the first level the same as the second clock signal.

According to an embodiment, a display device includes a display panel including a pixel, a scan driving circuit that provides a scan signal to the pixel, a driving controller that provides a start signal, a first clock signal, and a second clock signal to the scan driving circuit, and a voltage generator that provides a first voltage to a first voltage terminal of the scan driving circuit and provides a second voltage to a second voltage terminal of the scan driving circuit. The scan driving circuit includes an input part connected to the first voltage terminal, the second voltage terminal, and a carry input terminal and outputting a second signal to a second node, a controller that controls a first signal of a first node and the second signal of the second node, and a fifth transistor configured to be controlled by the first signal of the first node and outputting the second clock signal as the scan signal.

In an embodiment, the input part includes a first transistor connected between the first voltage terminal and a third node and including a gate electrode connected to a first clock input terminal that receives the first clock signal, a second transistor connected between the second voltage terminal and the second node, and including a gate electrode connected to the carry input terminal, and a third transistor connected between the third node and the second node and including a gate electrode connected to the carry input terminal.

In an embodiment, the second transistor and the third transistor may be transistors having different types from each other.

In an embodiment, the second signal of the second node may be determined by turning on one of the second transistor and the third transistor by the start signal provided to the carry input terminal.

In an embodiment, the first clock signal and the second clock signal may have frequencies the same as each other and different phases from each other.

In an embodiment, during a first period, each of the start signal and the first clock signal may be at a first level, and the second clock signal may be at a second level different from the first level. During a second period different from the first period, the second clock signal may be at the first level. During the second period, the scan signal may be at the first level the same as the second clock signal.

In an embodiment, during a third period different from each of the first period and the second period, each of the start signal and the second clock signal may be at the second level, and the first clock signal may be at the first level.

In an embodiment, the display device may further include a data driving circuit that provides a data signal. The pixel may include a light emitting element, a first pixel transistor including a first electrode, a second electrode connected to the light emitting element, and a gate electrode, and a second pixel transistor connected between a data line that receives the data signal and the first electrode of the first transistor and including a gate electrode that receives the scan signal.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
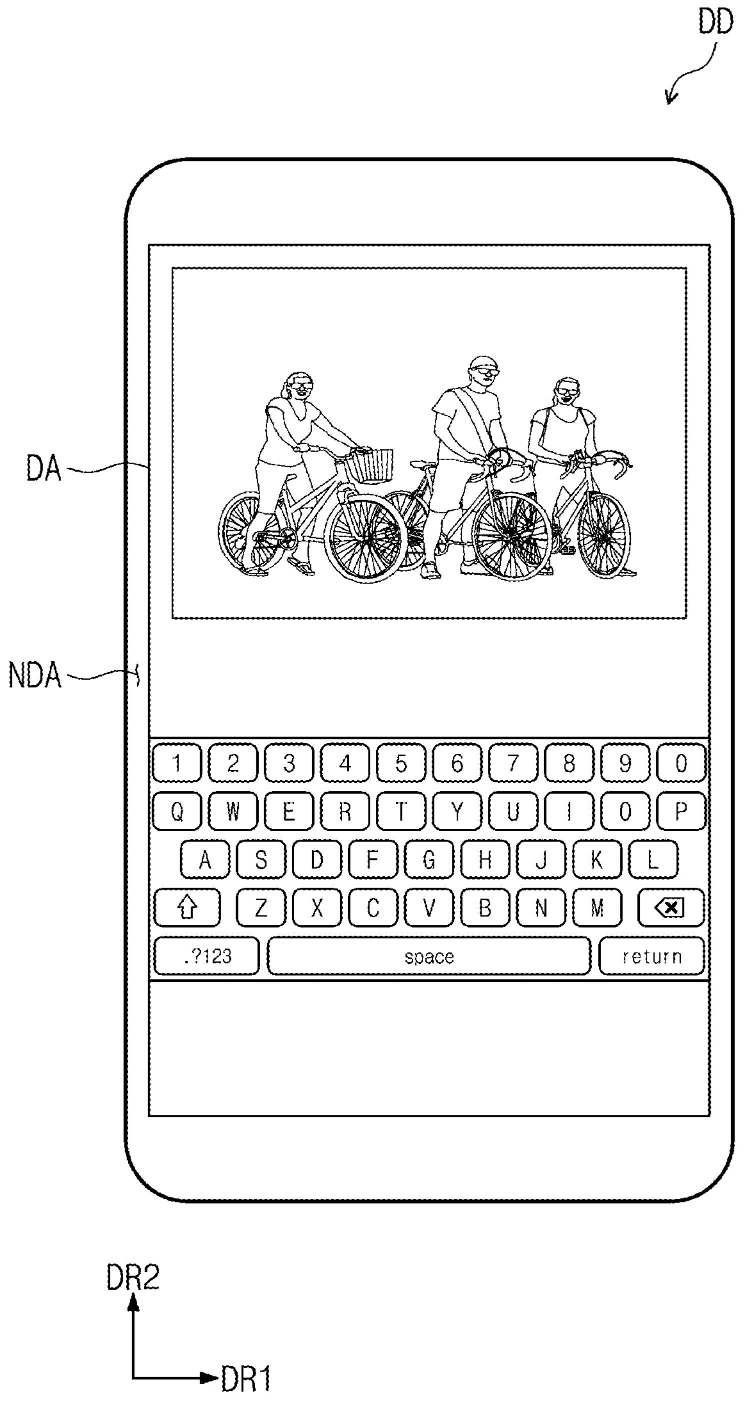
FIG. 1 illustrates a display device, according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

The same sign refers to the same element. Also, in drawings, the thickness, ratio, and dimension of components are exaggerated for effectiveness of description of technical contents. The term "and/or" includes one or more combinations of the associated listed items.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 shows a display device DD, according to an embodiment of the present disclosure.

Referring to FIG. 1, a portable terminal is illustrated as an example of a display device DD according to an embodiment of the present disclosure. The portable terminal may include a tablet PC, a smartphone, a personal digital assistant ("PDA"), a portable multimedia player ("PMP"), a game console, a wristwatch-type electronic device, and the like. However, the present disclosure is not limited thereto. The present disclosure may be used for small and medium electronic devices such as a personal computer, a notebook computer, a kiosk, a car navigation unit, and a camera, in addition to large-sized electronic equipment such as a television or an outside billboard. The above examples are provided only as an embodiment, and it is obvious that the display device DD may be applied to any other electronic device(s) without departing from the concept of the present disclosure.

As shown in FIG. 1, a display surface, on which an image is displayed, is parallel to a plane defined by a first direction DR1 and a second direction DR2. The display device DD includes a plurality of areas separated on the display surface. The display surface includes a display area DA, in which the image is displayed, and a non-display area NDA adjacent to the display area DA. The non-display area NDA may be referred to as a bezel area. For example, the display area DA may have a rectangular shape. The non-display area NDA surrounds the display area DA. Also, although not illustrated, for example, the display device DD may include a shape thus partially curved.

Figure 2:
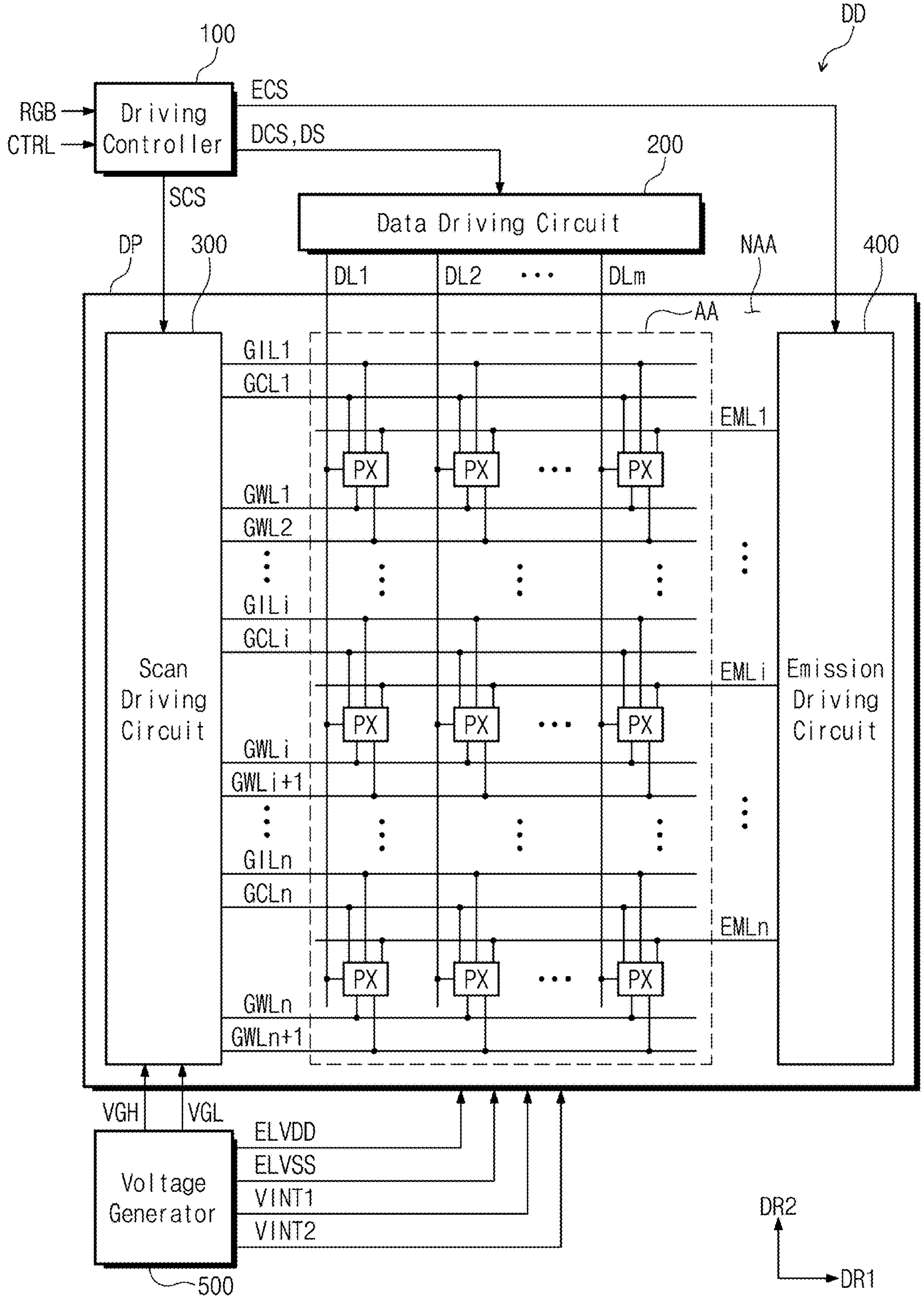
FIG. 2 is a block diagram of a display device, according to an embodiment of the present disclosure.

FIG. 2 is a block diagram of the display device DD, according to an embodiment of the present disclosure.

Referring to FIG. 2, the display device DD includes a display panel DP, a driving controller 100, a data driving circuit 200, a scan driving circuit 300, an emission driving circuit 400, and a voltage generator 500.

The driving controller 100 receives an image signal RGB and a control signal CTRL. The driving controller 100 converts the image signal RGB into an image data signal DS and outputs the image data signal DS. The driving controller 100 outputs a scan control signal SCS, a data control signal DCS, and an emission control signal ECS.

The data driving circuit 200 receives the data control signal DCS and the image data signal DS from the driving controller 100. The data driving circuit 200 converts the image data signal DS into data signals and then outputs the data signals to a plurality of data lines DL1 to DLm to be described later.

The scan driving circuit 300 receives the scan control signal SCS from the driving controller 100. The scan driving circuit 300 may output scan signals to the scan lines GIL1 to GILn, GCL1 to GCLn, and GWL1 to GWLn+1 in response to the scan control signal SCS.

The scan driving circuit 300 receives the emission control signal ECS from the driving controller 100. The scan driving circuit 300 may output emission signals to the emission lines EML1 to EMLn in response to the emission control signal ECS.

The voltage generator 500 generates voltages to operate the display panel DP. In an embodiment, the voltage generator 500 may generate a first driving voltage ELVDD, a second driving voltage ELVSS, a first initialization voltage VINT1, and a second initialization voltage VINT2, which are for an operation of the display panel DP. In an embodiment, the voltage generator 500 may generate a first voltage VGH and a second voltage VGL, which are for the operation of the scan driving circuit 300.

The display panel DP includes scan lines GIL1 to GILn, GCL1 to GCLn, and GWL1 to GWLn+1, emission lines EML1 to EMLn, the data lines DL1 to DLm, and pixels PX.

The display panel DP includes an active area AA and an inactive area NAA. The active area AA may correspond to the display area DA of the display device DD shown in FIG. 1, and the inactive area NAA may correspond to the non-display area NDA.

In an embodiment, the pixels PX may be placed in the active area AA of the display panel DP. The scan driving circuit 300 and the emission driving circuit 400 may be placed in the inactive area NAA of the display panel DP. In an embodiment, the scan driving circuit 300 is arranged adjacent to the first side of the active area AA. The scan lines GIL1 to GILn, GCL1 to GCLn, and GWL1 to GWLn+1 extend from the scan driving circuit 300 in the first direction DR1. The emission driving circuit 400 is arranged adjacent to the second side of the active area AA. The emission lines EML1 to EMLn extend from the emission driving circuit 400 in a direction opposite to the first direction DR1.

The scan lines GIL1 to GILn, GCL1 to GCLn, and GWL1 to GWLn+1 and the emission lines EML1 to EMLn are arranged spaced from one another in the second direction DR2. The data lines DL1 to DLm extend from the data driving circuit 200 in a direction opposite to the second direction DR2, and are arranged spaced from one another in the first direction DR1.

In the example shown in FIG. 2, the scan driving circuit 300 and the emission driving circuit 400 are arranged to face each other with the pixels PX interposed therebetween, but the present disclosure is not limited thereto. In an embodiment, for example, the scan driving circuit 300 and the emission driving circuit 400 may be placed adjacent to each other in the inactive area NAA of the display panel DP. In an embodiment, the scan driving circuit 300 and the emission driving circuit 400 may be implemented with one circuit.

The plurality of pixels PX are electrically connected to the scan lines GIL1 to GILn, GCL1 to GCLn, and GWL1 to GWLn+1, the emission lines EML1 to EMLn, and the data lines DL1 to DLm. Each of the plurality of pixels PX may be electrically connected to four scan lines and one emission line. In an embodiment, for example, as shown in FIG. 2, a first row of pixels may be connected to the scan lines GIL1, GCL1, GWL1, and GWL2 and the emission line EML1. Furthermore, the i-th row of pixels may be connected to the scan lines GILi, GCLi, GWLi, and GWLi+1 and the emission line EMLi. The n-th row of pixels in may be connected to the scan lines GILn, GCLn, GWLn, and GWLn+1 and the emission line EMLn.

Each of the plurality of pixels PX includes a light emitting element ED (see FIG. 3) and a pixel circuit PXC (see FIG. 3) for controlling the emission of the light emitting element ED. The pixel circuit PXC may include one or more transistors and one or more capacitors. The scan driving circuit 300 and the emission driving circuit 400 may include transistors formed through the same process as the pixel circuit PXC.

The scan driving circuit 300 according to an embodiment of the present disclosure is placed in the inactive area NAA of the display panel DP. The scan driving circuit 300 according to an embodiment of the present disclosure may minimize the circuit area by including the minimum number of transistors. Accordingly, it is possible to effectively minimize the area of the non-display area NDA of the display device DD (see FIG. 1) corresponding to the inactive area NAA of the display panel DP.

Figure 3:
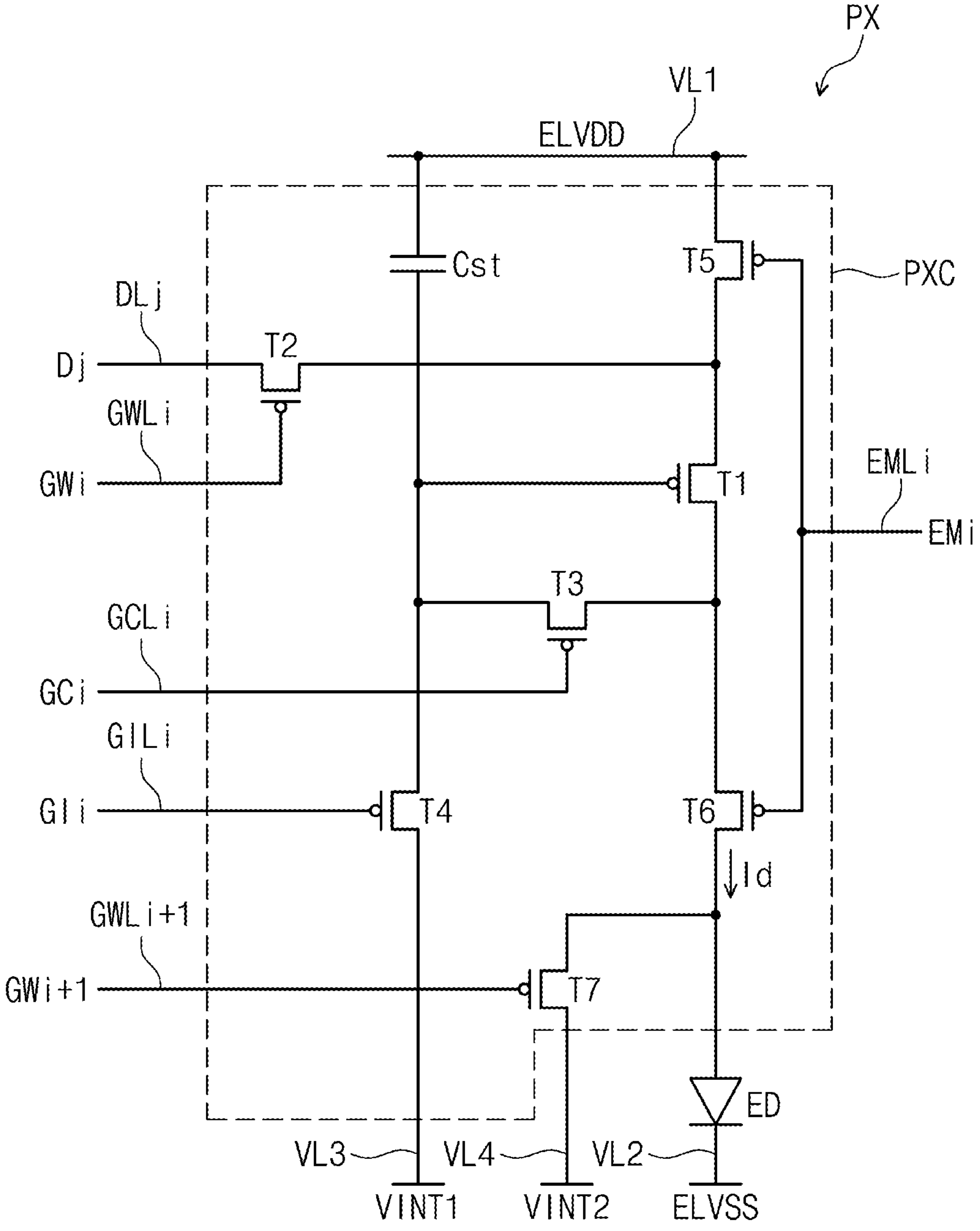
FIG. 3 is a circuit diagram of a pixel, according to an embodiment of the present disclosure.

FIG. 3 is a circuit diagram of a pixel PX, according to an embodiment of the present disclosure.

FIG. 3 illustrates a circuit diagram of a pixel PX connected to the j-th data line DLj among the data lines DL1 to DLm, the i-th scan lines GILi, GCLi, and GWLi and the (i+1)-th scan line GWLi+1 among the scan lines GIL1 to GILn, GCL1 to GCLn, and GWL1 to GWLn+1, and the i-th emission line EMLi among the emission lines EML1 to EMLn, which are illustrated in FIG. 2.

Each of the plurality of pixels PX shown in FIG. 2 may have the same circuit configuration as the pixel PX shown in FIG. 3.

Referring to FIG. 3, the pixel PX of a display device according to an embodiment includes the pixel circuit PXC and the at least one light emitting element ED. In an embodiment, the light emitting element ED may be a light emitting diode. In an embodiment, it is described that the one pixel PX includes the one light emitting element ED. The pixel circuit PXC includes first to seventh transistors T1, T2, T3, T4, T5, T6, and T7 and a capacitor Cst.

In an embodiment, each of the first to seventh transistors T1 to T7 is a P-type transistor having a low-temperature polycrystalline silicon ("LTPS") semiconductor layer. However, the present disclosure is not limited thereto. In an embodiment, for example, each of the first to seventh transistors T1 to T7 may be an N-type transistor using an oxide semiconductor as a semiconductor layer.

In an embodiment, at least one of the first to seventh transistors T1 to T7 may be an N-type transistor, and the other(s) thereof may be P-type transistors. Moreover, a circuit configuration of the pixel PX according to an embodiment of the present disclosure is not limited to an embodiment in FIG. 3, and may be implemented in a modified manner.

The scan lines GILi, GCLi, GWLi, and GWLi+1 may deliver scan signals GIi, GCi, GWi, and GWi+1, respectively. The emission line EMLi may deliver an emission signal EMi. The data line DLj delivers a data signal Dj. The data signal Dj may have a voltage level corresponding to the image signal RGB input to the display device DD (see FIG. 5). First to fourth driving voltage lines VL1, VL2, VL3, and VL4 may transfer the first driving voltage ELVDD, the second driving voltage ELVSS, the first initialization voltage VINT1, and the second initialization voltage VINT2, respectively.

The first transistor T1 includes a first electrode connected to the first driving voltage line VL1 via the fifth transistor T5, a second electrode electrically connected to an anode of the light emitting element ED via the sixth transistor T6, and a gate electrode connected to one end of the capacitor Cst. The first transistor T1 may receive the data signal Dj delivered through the data line DLj depending on the switching operation of the second transistor T2 and then may supply a driving current Id to the light emitting element ED.

The second transistor T2 includes a first electrode connected to the data line DLj, a second electrode connected to the first electrode of the first transistor T1, and a gate electrode connected to the scan line GWLi. The second transistor T2 may be turned on in response to the scan signal GWi transferred through the scan line GWLi and may transfer the data signal Dj transferred through the data line DLj to the first electrode of the first transistor T1.

The third transistor T3 includes a first electrode connected with the gate electrode of the first transistor T1, a second electrode connected with the second electrode of the first transistor T1, and a gate electrode connected with the scan line GCLi. The third transistor T3 may be turned on in response to the scan signal GCi transferred through the scan line GCLi, and thus, the gate electrode and the second electrode of the first transistor T1 may be connected, that is, the first transistor T1 may be diode-connected.

The fourth transistor T4 includes a first electrode connected with the gate electrode of the first transistor T1, a second electrode connected with the third driving voltage line VL3 through which the first initialization voltage VINT1 is transferred, and a gate electrode connected with the scan line GILi. The fourth transistor T4 may be turned on in response to the scan signal GIi transferred through the scan line GILi such that the first initialization voltage VINT1 is transferred to the gate electrode of the first transistor T1. Accordingly, an initialization operation of initializing a voltage of the gate electrode of the first transistor T1 may be performed.

The fifth transistor T5 includes a first electrode connected to the first driving voltage line VL1, a second electrode connected to the first electrode of the first transistor T1, and a gate electrode connected to the emission line EMLi.

The sixth transistor T6 includes a first electrode connected to the second electrode of the first transistor T1, a second electrode connected with the anode of the light emitting element ED, and a gate electrode connected to the emission line EMLi.

The fifth transistor T5 and the sixth transistor T6 may be simultaneously turned on in response to the emission signal EMi transferred through the emission line EMLi. In this way, the first driving voltage ELVDD may be compensated for through the diode-connected transistor T1 so as to be supplied to the light emitting element ED.

The seventh transistor T7 includes a first electrode connected to the second electrode of the sixth transistor T6, a second electrode connected to the fourth driving voltage line VL4, and a gate electrode connected to the scan line GWLi+1. The seventh transistor T7 is turned on in response to the scan signal GWi+1 transferred through the scan line GWLi+1 to bypass a current of the anode of the light emitting element ED to the fourth voltage line VL4.

As described above, one end of the capacitor Cst is connected to the gate electrode of the first transistor T1, and the other end of the capacitor Cst is connected to the first driving voltage line VL1. The cathode of the light emitting element ED may be connected to the second driving voltage line VL2, to which the second driving voltage ELVSS is delivered. The pixel circuit PXC according to an embodiment is not limited to that shown in FIG. 3. The number of transistors included in the pixel circuit PXC, the number of capacitors, and the connection relationship thereof may be modified in various manners.

Figure 4:
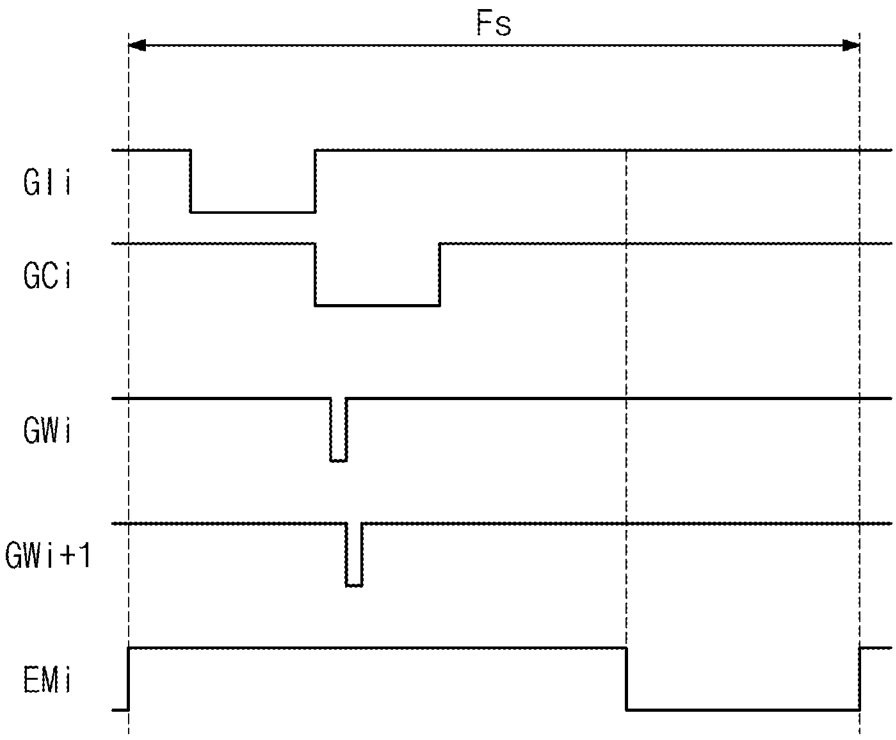
FIG. 4 is a timing diagram for describing an operation of a pixel illustrated in FIG. 3.

FIG. 4 is a timing diagram for describing an operation of a pixel illustrated in FIG. 3.

Referring to FIGS. 3 and 4, one frame Fs may include an initialization period, a data programming and compensation period, and an emission period.

When the scan signal GIi having a low level is provided through the scan line GILi during the initialization period, the fourth transistor T4 is turned on. The first initialization voltage VINT1 is delivered to the gate electrode of the first transistor T1 through the fourth transistor T4 so as to initialize the first transistor T1.

Next, when the scan signal GCi having a low level is supplied through the scan line GCLi during the data programming and compensation period, the third transistor T3 is turned on. The first transistor T1 is diode-connected by the third transistor T3 thus turned on to be forward-biased. In this case, when the scan signal GWi having a low level is supplied through the scan line GWLi, the second transistor T2 is turned on. In the case, a compensation voltage, which is obtained by reducing the voltage of the data signal Dj supplied from the data line DLj by a threshold voltage of the first transistor T1, is applied to the gate electrode of the first transistor T1. That is, a gate voltage applied to the gate electrode of the first transistor T1 may be a compensation voltage.

As the first driving voltage ELVDD and the compensation voltage are applied to opposite ends of the capacitor Cst, respectively, charges corresponding to a difference between the first driving voltage ELVDD and the compensation voltage may be stored in the capacitor Cst.

In the meantime, when the scan signal GWi+1 having a low level is provided to the gate electrode of the seventh transistor T7 through the scan line GWLi+1, the seventh transistor T7 is turned on. As the seventh transistor T7 is turned on, the anode of the light emitting element ED is electrically connected to the fourth driving voltage line VL4. Accordingly, the anode of the light emitting element ED may be initialized to the second initialization voltage VINT2.

Next, during the emission period, the emission signal EMi supplied from the emission line EMLi is changed from a high level to a low level. During the emission period, the fifth transistor T5 and the sixth transistor T6 are turned on by the emission signal EMi having a low level. In this case, the driving current Id according to a voltage difference between the gate voltage of the gate electrode of the first transistor T1 and the first driving voltage ELVDD is generated and supplied to the light emitting element ED through the sixth transistor T6, and the driving current Id flows through the light emitting element ED. The light emitting element ED may emit light with luminance corresponding to the driving current Id.

Figure 5:
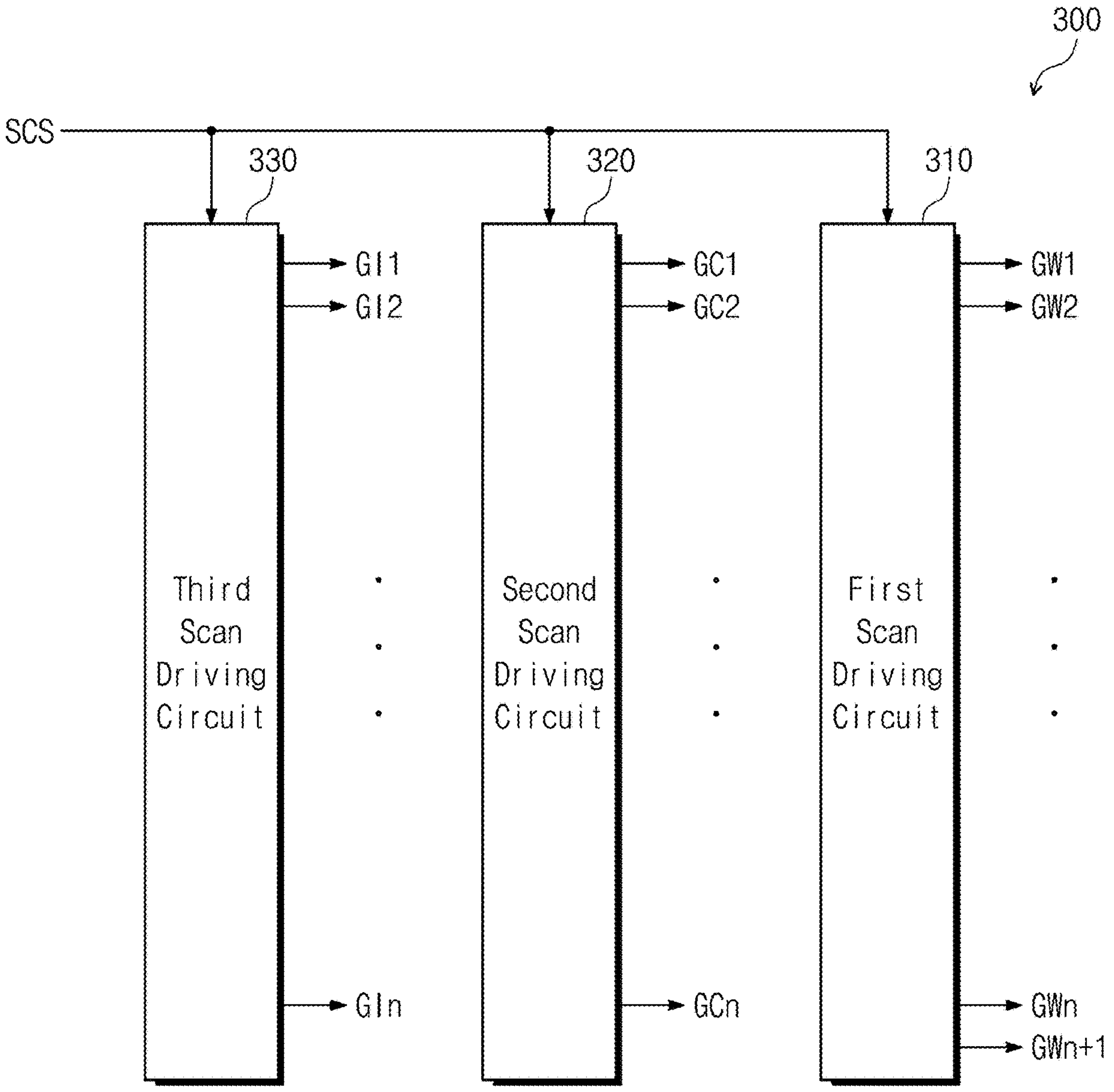
FIG. 5 is a block diagram of a scan driving circuit, according to an embodiment of the present disclosure.

FIG. 5 is a block diagram of the scan driving circuit 300, according to an embodiment of the present disclosure.

Referring to FIG. 5, the scan driving circuit 300 includes a first scan driving circuit 310, a second scan driving circuit 320, and a third scan driving circuit 330.

The first scan driving circuit 310 outputs scan signals GW1 to GWn+1 in response to the scan control signal SCS. In an embodiment, the scan signals GW1 to GWn+1 may sequentially transition to a first level (e.g., a low level).

The second scan driving circuit 320 outputs scan signals GC1 to GCn in response to the scan control signal SCS. The scan signals GC1 to GCn may sequentially transition to the first level (e.g., a low level).

The third scan driving circuit 330 outputs the scan signals GI1 to GIn in response to the scan control signal SCS. The scan signals GI1 to GIn may sequentially transition to the first level (e.g., a low level).

Figure 6:
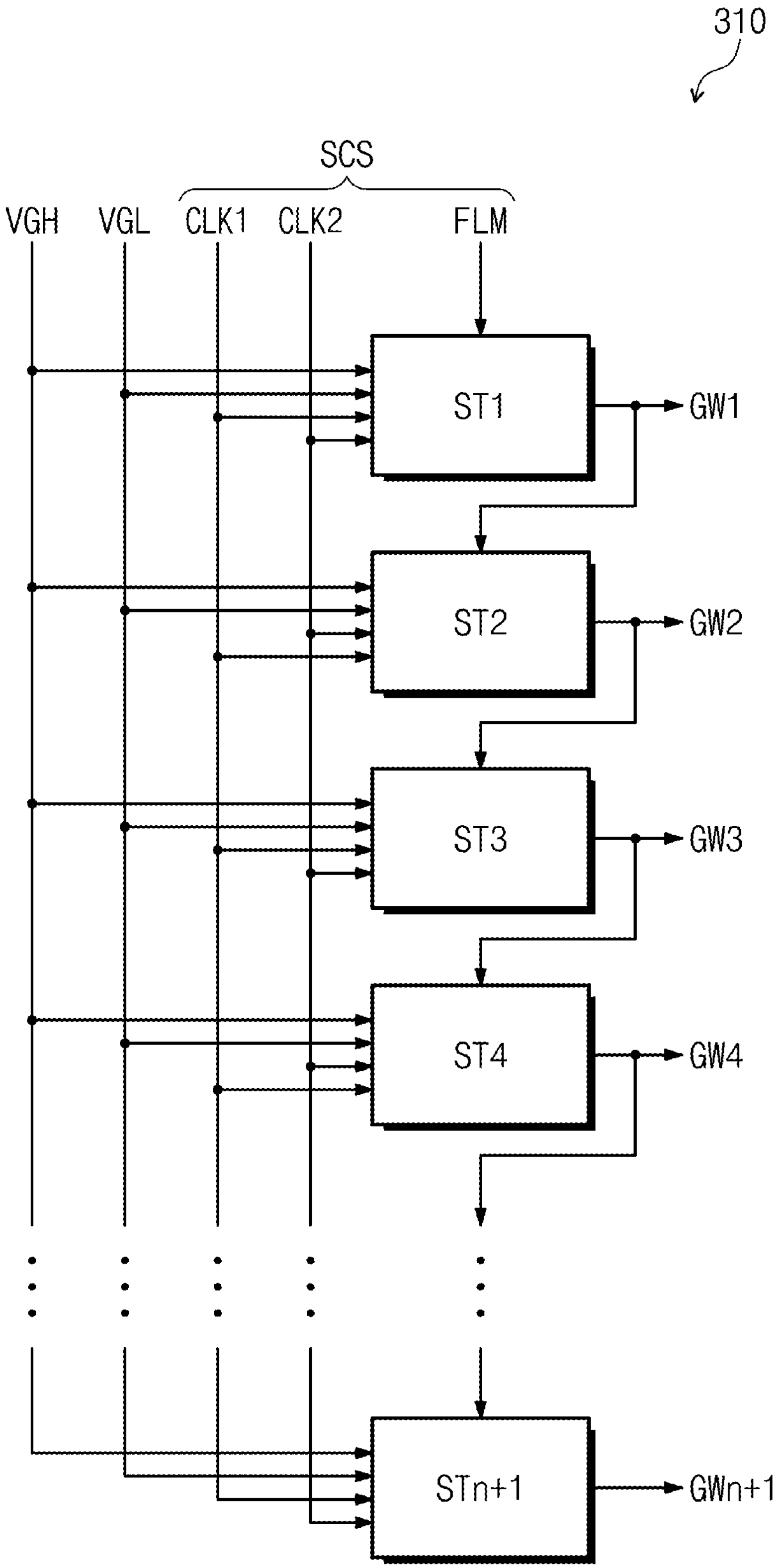
FIG. 6 is a block diagram of a first scan driving circuit, according to an embodiment of the present disclosure.

FIG. 6 is a block diagram of the first scan driving circuit 310, according to an embodiment of the present disclosure.

Referring to FIG. 6, the first scan driving circuit 310 includes driving stages ST1 to STn+1.

Each of the driving stages ST1 to STn+1 receives the scan control signal SCS from the driving controller 100 shown in FIG. 2. The scan control signal SCS includes a start signal FLM, a first clock signal CLK1, and a second clock signal CLK2. Each of the driving stage ST1 to STn+1 receives a first voltage VGH and a second voltage VGL. The first voltage VGH and the second voltage VGL may be provided from the voltage generator 500 illustrated in FIG. 2.

In an embodiment, the driving stage ST1 to STn+1 output the scan signals GW1 to GWn+1, respectively. The scan signals GW1 to GWn+1 may be provided to the scan lines GWL1 to GWLn+1 shown in FIG. 2, respectively.

The driving stage ST1 receives the start signal FLM as a "carry signal". Each of the driving stages ST2 to STn+1 has a dependent connection relationship indicating that the scan signal output from the previous driving stage is received as the "carry signal". In an embodiment, for example, the scan signal GWi output from the i-th driving stage STi among the driving stages may be provided as a carry signal of the (i+k)-th driving stage STi+k (each of 'I' and 'k' is a natural number). In an embodiment, for example, the second driving stage ST2 receives the scan signal GW1 output from the first driving stage ST1 as a carry signal. The third driving stage ST3 receives the scan signal GW2 output from the second driving stage ST2 as a carry signal. FIG. 6 shows that the i-th driving stage STi receives a scan signal from the (i−1)-th driving stage STi−1 as a carry signal, but the present disclosure is not limited thereto.

Although only the first scan driving circuit 310 is shown in FIG. 6, the second scan driving circuit 320 and the third scan driving circuit 330 shown in FIG. 5 may also include the same components as the first scan driving circuit 310.

Figure 7:
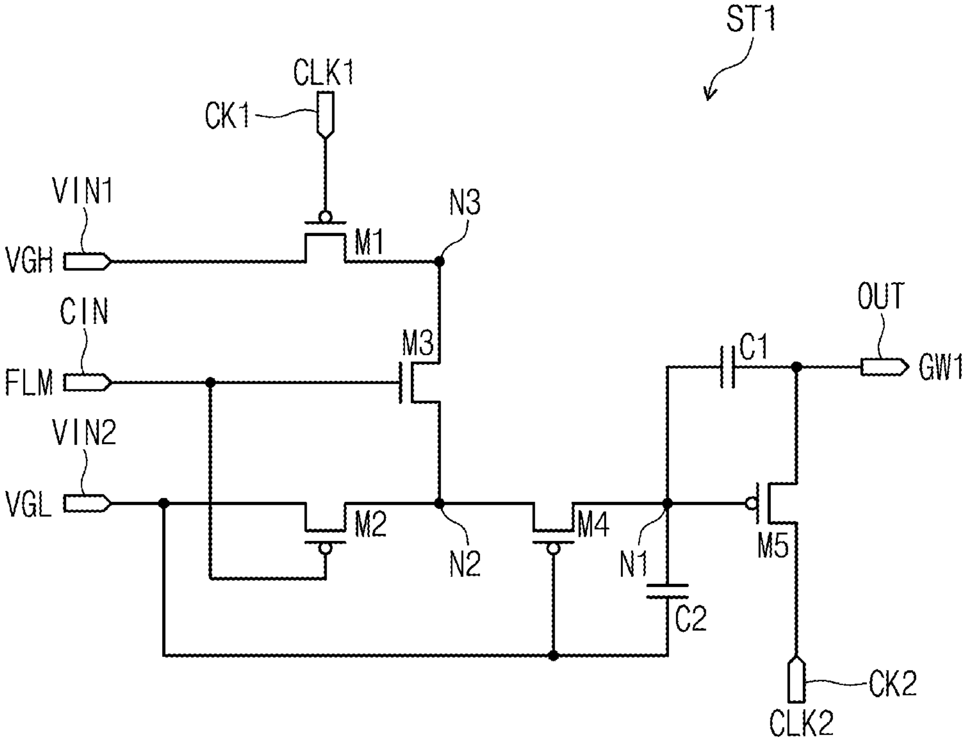
FIG. 7 is a circuit diagram of a driving stage, according to an embodiment of the present disclosure.

FIG. 7 is a circuit diagram of a driving stage ST1, according to an embodiment of the present disclosure.

Referring to FIG. 7, the driving stage ST1 includes first to fifth transistors M1 to M5 and first and second capacitors C1 and C2. Moreover, the driving stage ST1 further includes first and second clock input terminals CK1 and CK2, a carry input terminal CIN, first and second voltage terminals VIN1 and VIN2, and an output terminal OUT.

The driving stage ST1 outputs the scan signal GW1 to the output terminal OUT in response to the first and second clock signals CLK1 and CLK2, which are received through the first and second clock input terminals CK1 and CK2, and the carry signal received through the carry input terminal CIN (i.e., the start signal FLM).

Each of the first and second voltages VGH and VGL received through the first and second voltage terminals VIN1 and VIN2 may be a direct current ("DC") voltage having a predetermined voltage level. In an embodiment, the first voltage VGH may have a higher voltage level than the second voltage VGL.

In an embodiment, the first and second clock signals CLK1 and CLK2 may have the same frequency as each other and different phases from each other. In an embodiment, for example, the first and second clock signals CLK1 and CLK2 may have 180 degrees phase difference from each other.

An input part of the driving stage ST1 is connected to the first voltage terminal VIN1, the second voltage terminal VIN2, and the carry input terminal CIN, and outputs a second signal to a second node N2. In an embodiment, the "input part" may include the first, second and third transistors M1, M2, and M3.

The first transistor M1 is connected between the first voltage terminal VIN1 and a third node N3, and includes a gate electrode connected to the first clock input terminal CK1.

The second transistor M2 is connected between the second voltage terminal VIN2 and the second node N2 and includes a gate electrode connected to the carry input terminal CIN.

The third transistor M3 is connected between the third node N3 and the second node N2 and includes a gate electrode connected to the carry input terminal CIN.

In an embodiment, one of the second transistor M2 and the third transistor M3 may be turned on in response to the start signal FLM input to the carry input terminal CIN, and thus the second signal of the second node N2 may be determined. In an embodiment, when the start signal FLM has a low level, the third transistor M3 may be turned off and the second transistor M2 may be turned on. Therefore, the second signal of the second node N2 may be the same as the second voltage VGL. when the start signal FLM has a high level, the second transistor M2 may be turned off and the third transistor M3 may be turned on. As used herein, "a signal of a node" means a signal at the node.

A controller of the driving stage ST1 controls a first signal of the first node N1 and the second signal of the second node N2. In an embodiment, the "controller" may include the fourth transistor M4. The fourth transistor M4 is connected between the second node N2 and the first node N1 and includes a gate electrode connected to the second voltage terminal VIN2.

The fifth transistor M5 is connected between the output terminal OUT and the second clock input terminal CK2 and includes a gate electrode connected to the first node N1.

The first capacitor C1 is connected between the first node N1 and the output terminal OUT.

The second capacitor C2 is connected between the first node N1 and the second voltage terminal VIN2.

In an embodiment, some of the first, second, fourth, and fifth transistors M1, M2, M4, and M5 are P-type transistors having LTPS as a semiconductor layer. The third transistor M3 may be an N-type transistor having an oxide semiconductor as a semiconductor layer. However, the present disclosure is not limited thereto. In another embodiment, at least one of the first to fifth transistors M1 to M5 may be a P-type transistor, and the others thereof may be N-type transistors.

The driving stage ST1 may include five transistors (i.e., the first to fifth transistors M1 to M5) and two capacitors (i.e., the first and second capacitors C1 and C2) to output the scan signal GW1. The circuit area of the scan driving circuit 300 (see FIG. 2) may be effectively minimized by minimizing the number of transistors and of capacitors, which are included in the driving stage ST1.

Although only the driving stage ST1 is shown in FIG. 7, each of the driving stages ST1 to STn+1 shown in FIG. 6 may include a circuit configuration similar to the driving stage ST1 shown in FIG. 7.

Each of some driving stages (e.g., the odd-numbered driving stages ST1, ST3, . . . , and STn+1) of the driving stage ST1 to STn+1 shown in FIG. 6 may include the same circuit configuration as the driving stage ST1 shown in FIG. 7.

Each of the other driving stages (e.g., even-numbered driving stages ST2, ST4, . . . , and STn) among the driving stages ST1 to STn+1 shown in FIG. 6 may include some different circuit configurations from the driving stage ST1 shown in FIG. 7. In an embodiment, for example, the first clock input terminal CK1 of each of the even-numbered driving stage ST2, ST4, . . . , and STn may receive the second clock signal CLK2, and the second clock input terminal CK2 of each of the even-numbered driving stage ST2, ST4, . . . , and STn may receive the first clock signal CLK1.

FIGS. 8A to 8E are circuit diagrams for describing an operation of the driving stage ST1.

FIGS. 9A to 9E are timing diagrams for describing an operation of the driving stage ST1.

Figure 8A:
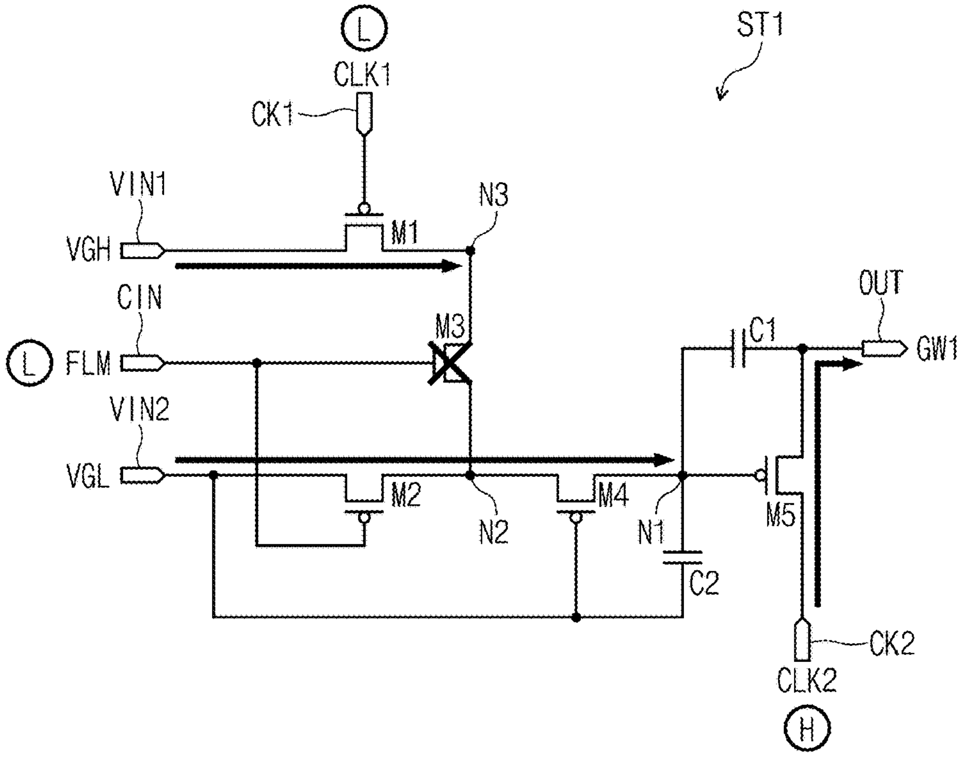
FIGS. 8A to 8E are circuit diagrams for describing an operation of a driving stage.
Figure 9A:
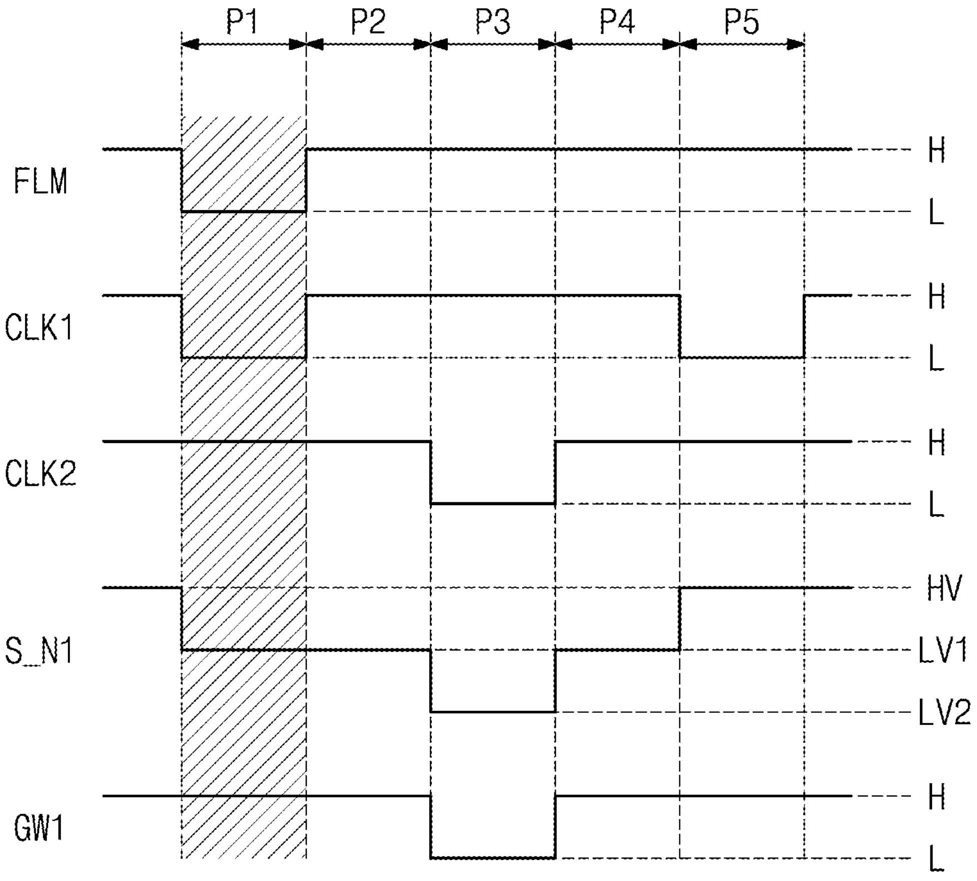
FIGS. 9A to 9E are timing diagrams for describing an operation of a driving stage.

Referring to FIGS. 8A and 9A, during a first period P1, each of a carry signal (i.e., the start signal FLM) and the first clock signal CLK1 is at a low level L, and the second clock signal CLK2 is at a high level H.

When the start signal FLM is at the low level L, the third transistor M3 is turned off. When the first clock signal CLK1 is at the low level L, the first transistor M1 is turned on.

When the start signal FLM is at the low level L, the second transistor M2 is turned on. Because the gate electrode of the fourth transistor M4 is connected to the second voltage terminal VIN2, the fourth transistor M4 is always turned on. Because both the first and fourth transistors M1 and M4 are turned on, the second voltage VGL may be delivered to the first node N1. Accordingly, a first signal S_N1 of the first node N1 may be at a first low voltage level LV1 corresponding to the second voltage VGL.

When the first signal S_N1 is at the first low voltage level LV1, the fifth transistor M5 may be turned on. As the fifth transistor M5 is turned on, the second clock signal CLK2, which is at the high level H, is output to the output terminal OUT through the fifth transistor M5. Accordingly, in the first period P1, the scan signal GW1 is at the high level H.

During the first period P1, the second voltage VGL, which is a direct current voltage, may be delivered to the first node N1. Accordingly, during the first period P1, the first signal S_N1 of the first node N1 may be maintained at a stable first low voltage level LV1. As the first signal S_N1 of the first node N1 is maintained at a constant voltage level, the turn-on state of the fifth transistor T5 may be maintained stably.

Figure 8B:
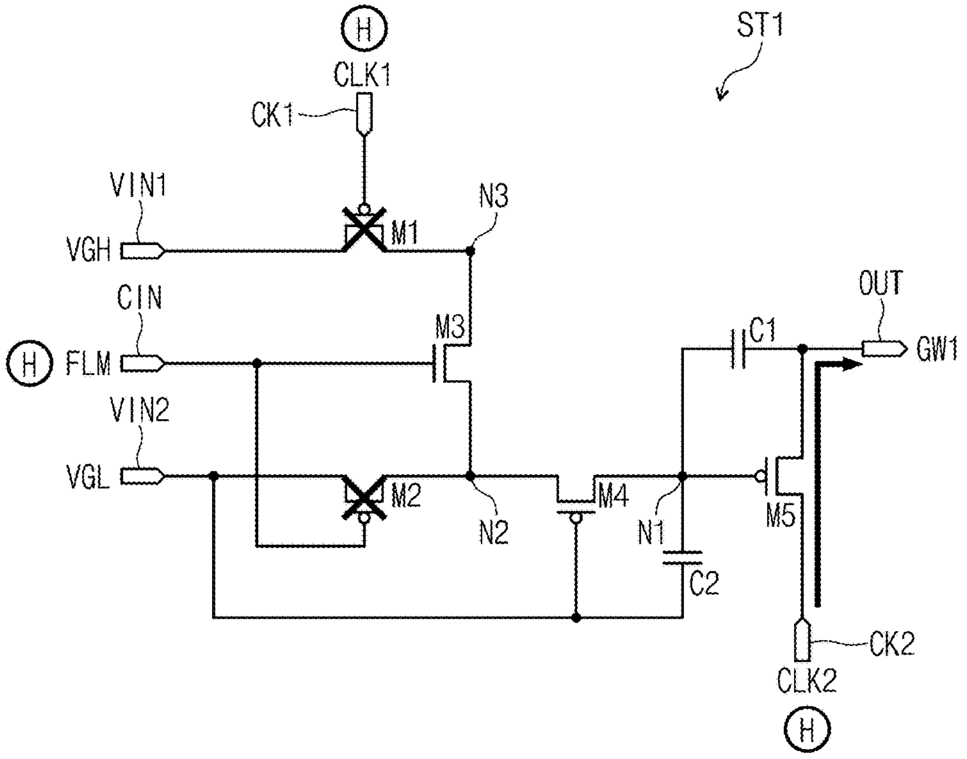
Figure 9B:
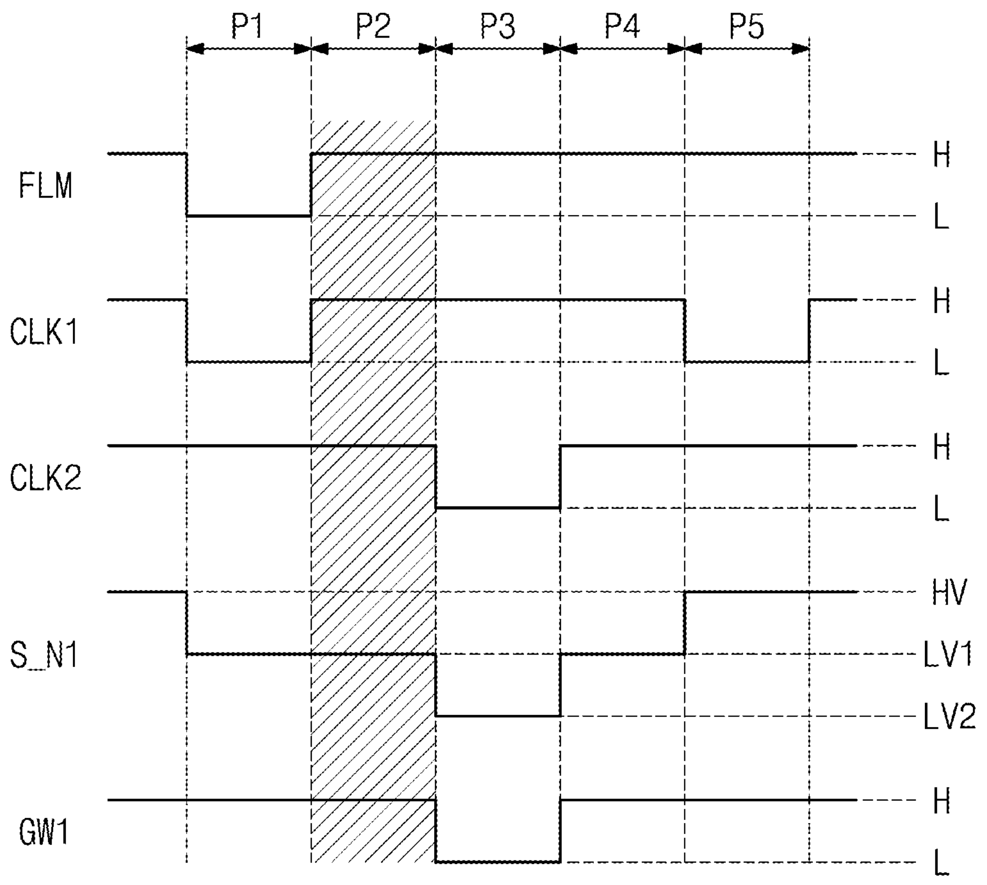

Referring to FIGS. 8B and 9B, during the second period P2, each of the start signal FLM, the first clock signal CLK1, and the second clock signal CLK2 is at the high level H.

When the start signal FLM is at the high level H, the third transistor M3 is turned on and the second transistor M2 is turned off.

When the first clock signal CLK1 is at the high level H, the first transistor M1 is turned off.

Because the third transistor M3 is turned on, but the first and second transistors M1 and M2 are turned off, the first signal S_N1 of the first node N1 may be maintained at the first low voltage level LV1 by the second capacitor C2.

Because the fifth transistor M5 remains turned on while the first signal S_N1 remains at the first low voltage level LV1, the second clock signal CLK2, which is at the high level H, is output to the output terminal OUT through the fifth transistor M5. Accordingly, in the second period P2, the scan signal GW1 is at the high level H.

Figure 8C:
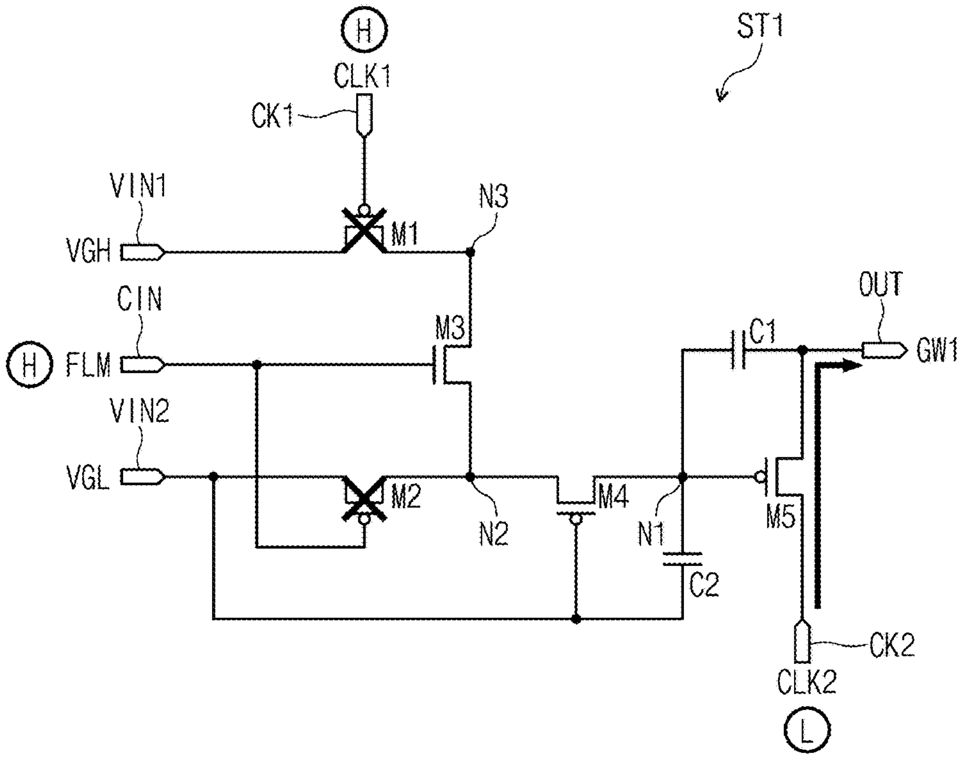
Figure 9C:
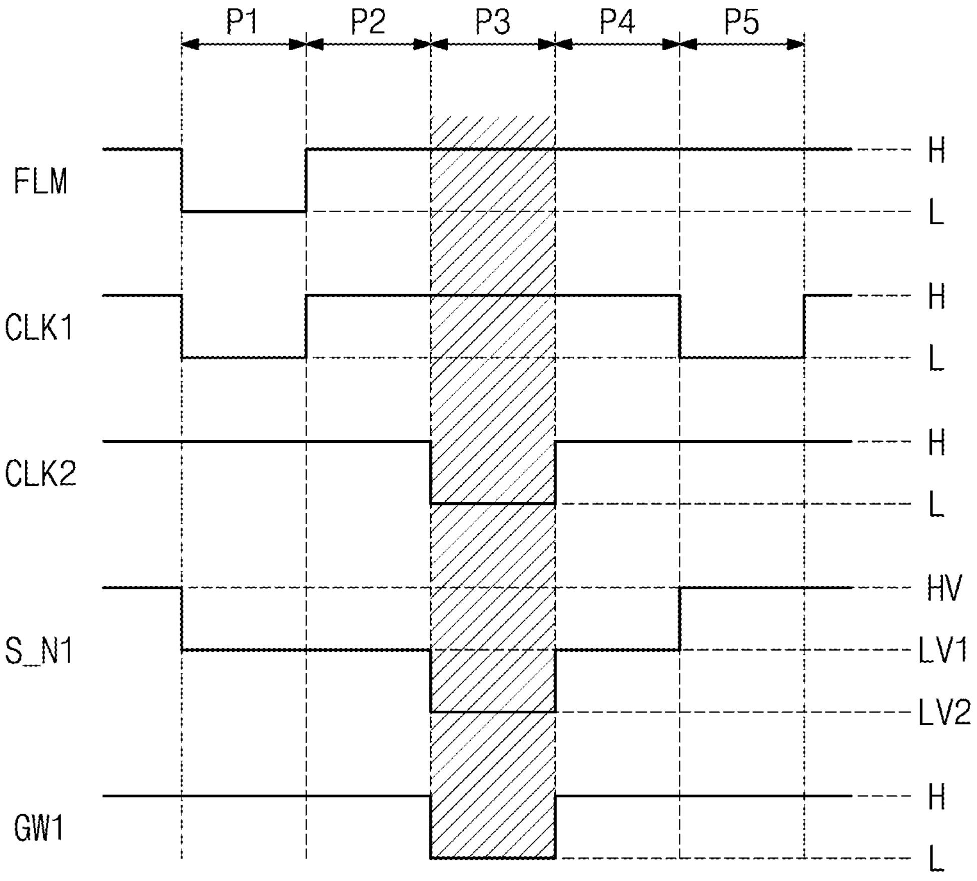

Referring to FIGS. 8C and 9C, during the third period P3, each of the start signal FLM and the first clock signal CLK1 is at the high level H, and the second clock signal CLK2 is at the low level L.

When the start signal FLM is at the high level H, the third transistor M3 is turned on and the second transistor M2 is turned off.

When the first clock signal CLK1 is at the high level H, the first transistor M1 is turned off.

When the fifth transistor M5 is turned on in the second period P2, and then the second clock signal CLK2 transitions from the high level H to the low level L in the third period P3, the second clock signal CLK2, which is at the low level L, is output to the output terminal OUT through the fifth transistor M5. Accordingly, in the third period P3, the scan signal GW1 is at the low level L.

As the scan signal GW1 of the output terminal OUT transitions from the high level H to the low level L, the first signal S_N1 of the first node N1 may be changed to a second low voltage level LV2 lower than the first low voltage level LV1 by the first capacitor C1.

As the voltage level of the first signal S_N1 becomes lower, the fifth transistor M5 may be completely turned on. Accordingly, in the third period P3, the scan signal GW1 may be maintained at the low level L of the second clock signal CLK2.

Figure 8D:
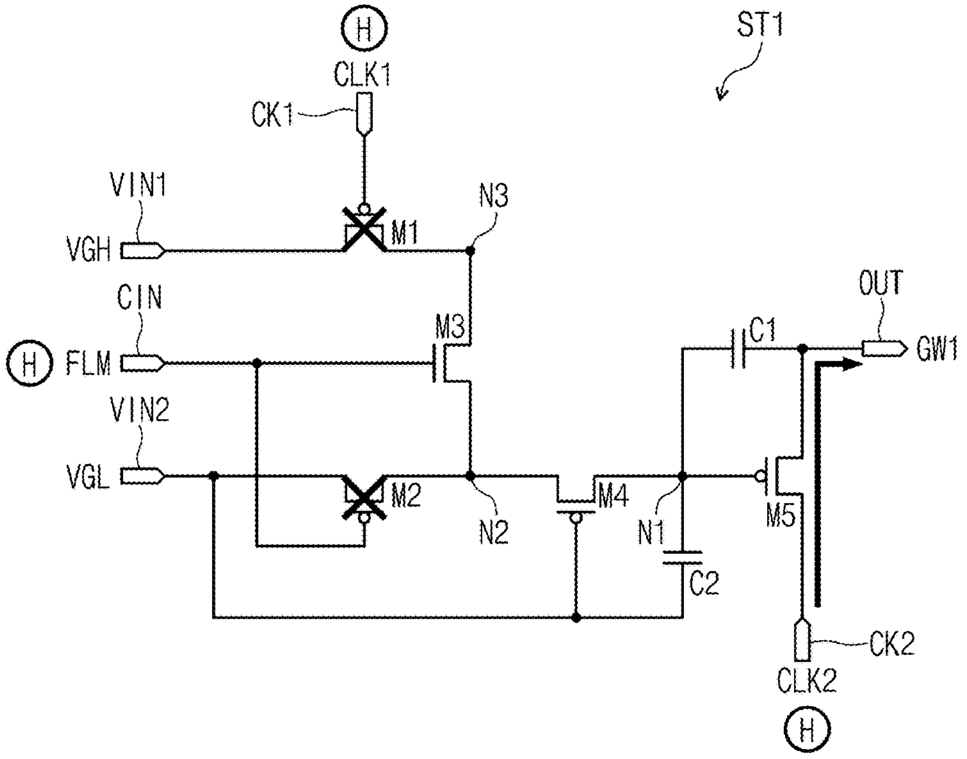
Figure 9D:
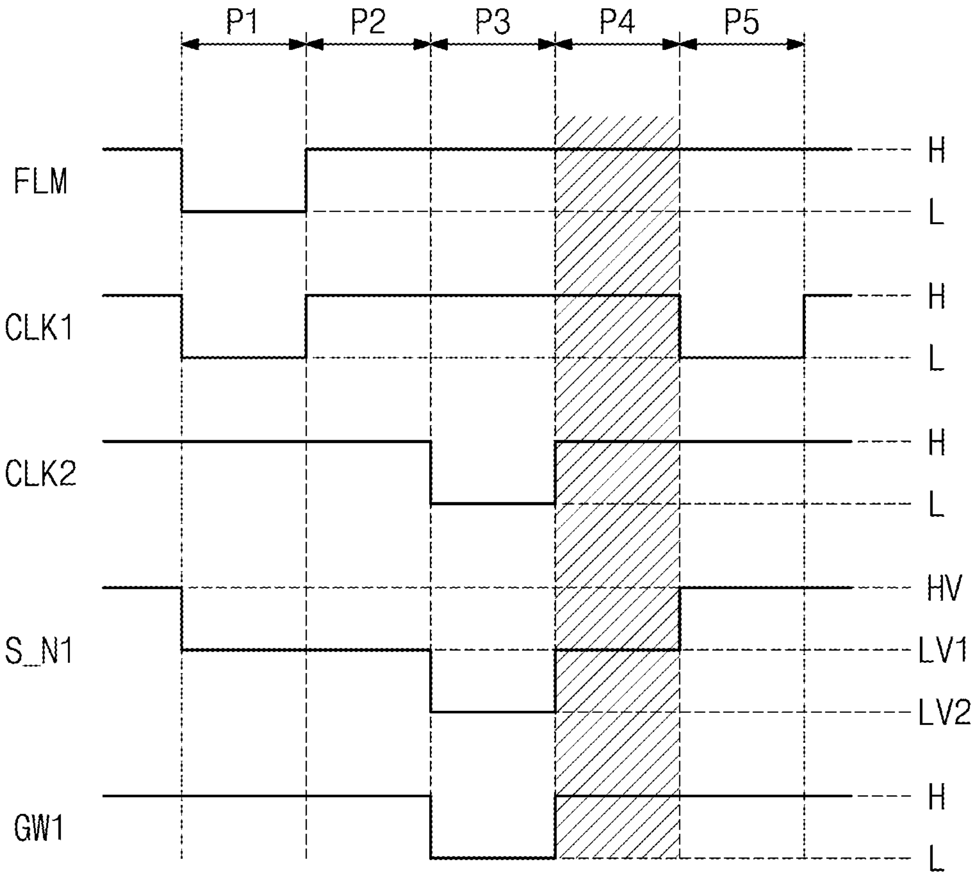

Referring to FIGS. 8D and 9D, during the fourth period P4, each of the start signal FLM, the first clock signal CLK1, and the second clock signal CLK2 is at the high level H.

When the start signal FLM is at the high level H, the third transistor M3 is turned on and the second transistor M2 is turned off.

When the first clock signal CLK1 is at the high level H, the first transistor M1 is turned off.

When the fifth transistor M5 is turned on in the third period P3, and then the second clock signal CLK2 transitions from the low level L to the high level H in the fourth period P4, the second clock signal CLK2, which is at the high level L, is output to the output terminal OUT through the fifth transistor M5. Accordingly, in the fourth period P4, the scan signal GW1 is at the high level H.

As the scan signal GW1 of the output terminal OUT transitions from the low level L to the high level H, the first signal S_N1 of the first node N1 may be changed to the first low voltage level LV1 higher than the second low voltage level LV2 by the first capacitor C1.

Because the fifth transistor M5 remains turned on even though the voltage level of the first signal S_N1 is changed to the first low voltage level LV1, the level of the scan signal GW1 may be equal to the high level H of the second clock signal CLK2 in the fourth period P4.

Figure 8E:
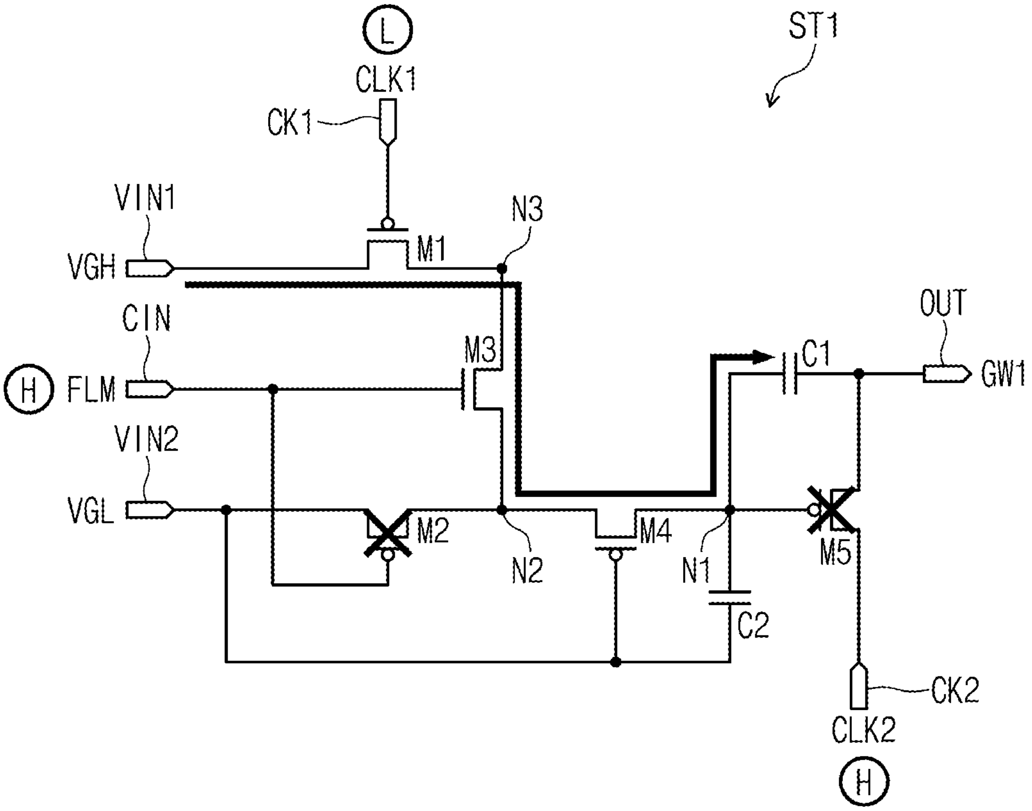
Figure 9E:
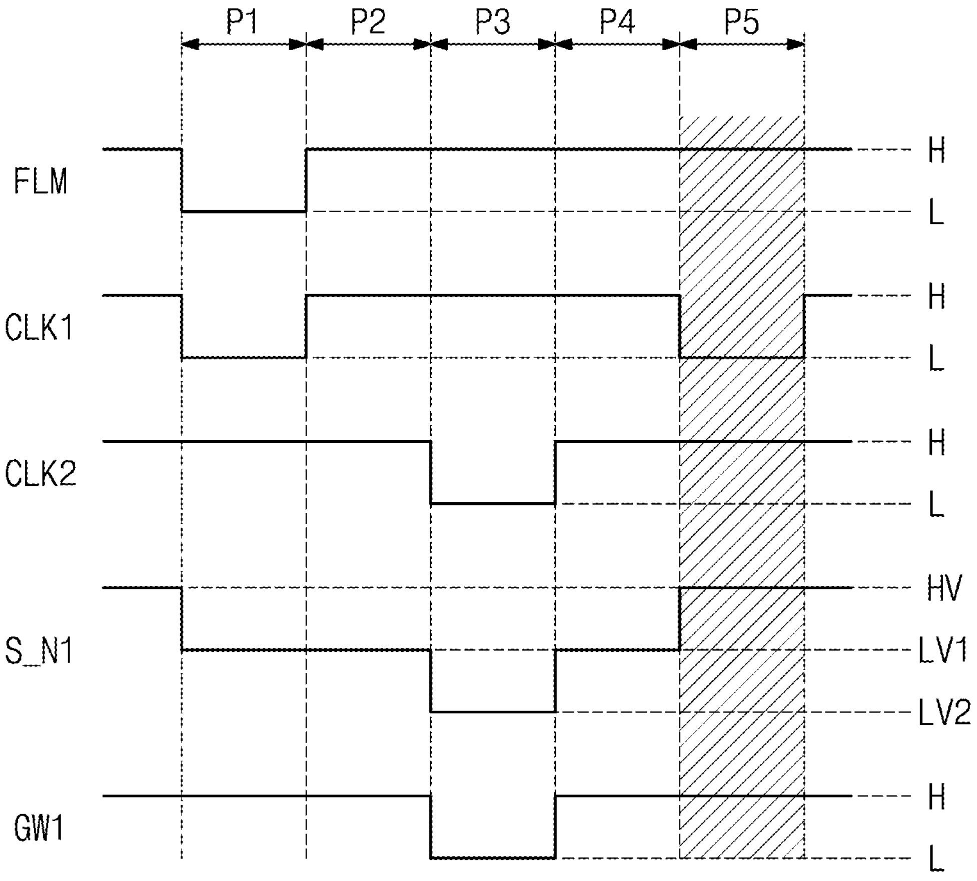

Referring to FIGS. 8E and 9E, during the fifth period P5, each of the start signal FLM and the second clock signal CLK2 is at the high level H, and the first clock signal CLK1 is at the low level L.

When the start signal FLM is at the high level H, the third transistor M3 is turned on and the second transistor M2 is turned off.

When the first clock signal CLK1 is at the low level L, the first transistor M1 is turned on. Accordingly, the first voltage VGH may be delivered to the first node N1 through the second transistor M2, the third transistor M3, and the fourth transistor M4 that are turned on.

When the first signal S_N1 of the first node N1 is changed to a high voltage level HV corresponding to the first voltage VGH, the fifth transistor M5 is turned off.

Because the scan signal GW1 of the output terminal OUT is at the high level H in the fourth period P4, the scan signal GW1 may be maintained at the high level H by the first capacitor C1 in the fifth period P5. Furthermore, in the fifth period P5, the first signal S_N1 of the first node N1 may be maintained at the high level H by the second capacitor C2.

During the fifth period P5, the first voltage VGH, which is a DC voltage, may be delivered to the first node N1. Accordingly, during the fifth period P5, the first signal S_N1 of the first node N1 may be maintained at a stable high voltage level HV. As the first signal S_N1 of the first node N1 is maintained at a constant voltage level, the turn-on state of the fifth transistor T5 may be maintained stably.

Figure 10:
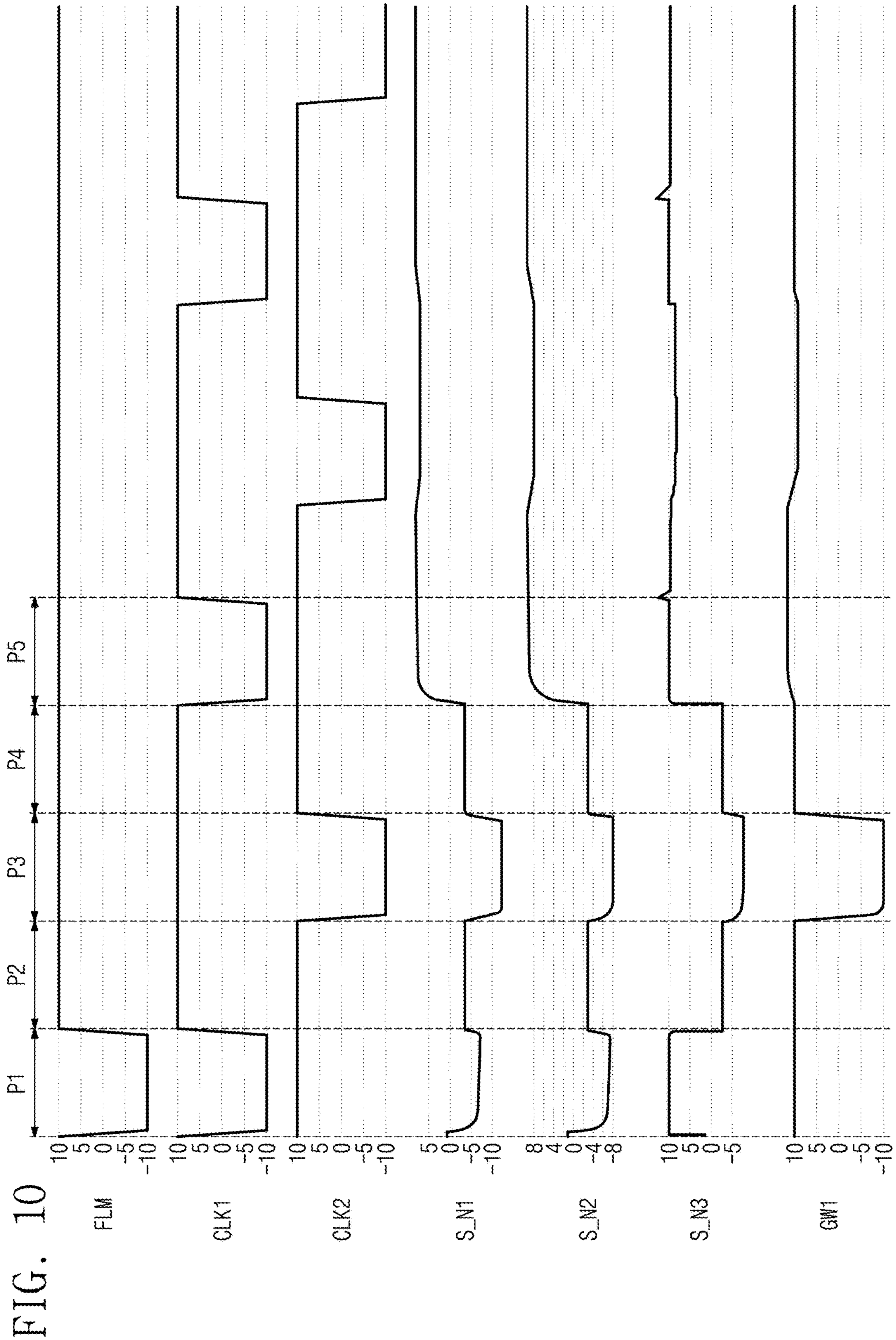
FIG. 10 is a diagram illustrating a result of simulating an operation of a driving stage, according to an embodiment of the present disclosure.

FIG. 10 is a diagram illustrating the result of simulating an operation of the driving stage ST1, according to an embodiment of the present disclosure.

In FIG. 10, numbers described on a vertical axis indicate voltage levels corresponding to the start signal FLM, the first clock signal CLK1, the second clock signal CLK2, the first signal S_N1 of the first node N1, a second signal S_N2 of the second node N2, and a third signal S_N3 of the third node N3, respectively. However, the present disclosure is not limited thereto.

Referring to FIGS. 7 and 10, it may be seen that the driving stage ST1 operates in the same manner as described in FIGS. 8A to 8E and 9A to 9E in the first to fifth periods P1 to P5, respectively.

Because the fourth transistor M4 always remains turned on, the second signal S_N2 of the second node N2 may have a similar waveform to the first signal S_N1 of the first node N1.

In each of the first period P1 and the fifth period P5 in each of which the first clock signal CLK1 is at a low level, the third signal S_N3 of the third node N3 may be the same voltage level HV (see FIG. 9A) as the first voltage VGH.

Because the third transistor M3 is turned on during the second to fourth periods P2, P3, and P4, the third signal S_N3 of the third node N3 may have a similar waveform to the second signal S_N2 of the second node N2.

Figure 11:
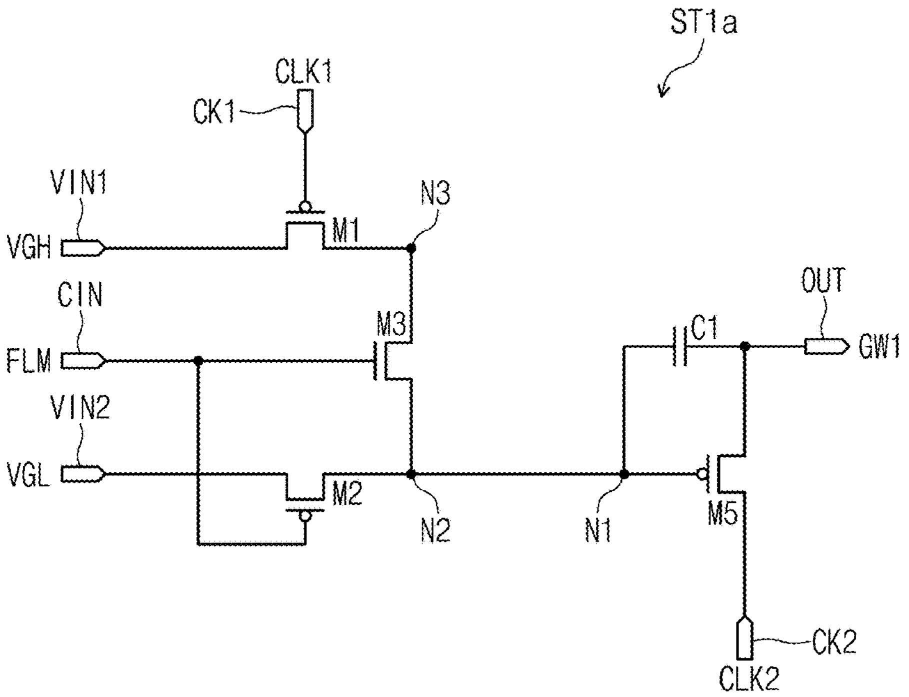
FIG. 11 is a circuit diagram of a driving stage, according to another embodiment of the present disclosure.

FIG. 11 is a circuit diagram of a driving stage ST1*a*, according to another embodiment of the present disclosure.

Referring to FIG. 11, the driving stage ST1*a* includes the first, second, third, and fifth transistors M1, M2, M3, and M5, and the first capacitor C1. The driving stage ST1*a* further includes the first and second clock input terminals CK1 and CK2, the carry input terminal CIN, the first and second voltage terminals VIN1 and VIN2, and the output terminal OUT.

The first, second, third and fifth transistors M1, M2, M3, and M5 and the first capacitor C1 of the driving stage ST1*a* are similar to the first, second, third and fifth transistors M1, M2, M3, and M5, and the first capacitor C1 of the driving stage ST1 shown in FIG. 7. Accordingly, the same reference numerals are used for components, which are similar to components in the driving stage ST1 shown in FIG. 7, and additional descriptions are omitted to avoid redundancy.

The first node N1 of the driving stage ST1*a* may be directly connected to the second node N2.

The driving stage ST1 shown in FIG. 7 includes the fourth transistor M4 and the second capacitor C2. On the other hand, the driving stage ST1*a* shown in FIG. 11 does not include the fourth transistor M4 and the second capacitor C2.

According to the stable circuit design of the first, second, third and fifth transistors M1, M2, M3, and M5 and the first capacitor C1 of the driving stage ST1*a*, parasitic capacitance between the first node N1 and surrounding components may be minimized. In this case, because losses due to leakage current at the first node N1 may be minimized, the operational reliability of the driving stage ST1*a* may be improved even without including the fourth transistor M4 and the second capacitor C2 shown in FIG. 7.

The driving stage ST1*a* includes the first, second, third, and fifth transistors M1, M2, M3, and M5, and the first capacitor C1. The circuit area may be reduced compared to the driving stage ST1 shown in FIG. 7.

Figure 12:
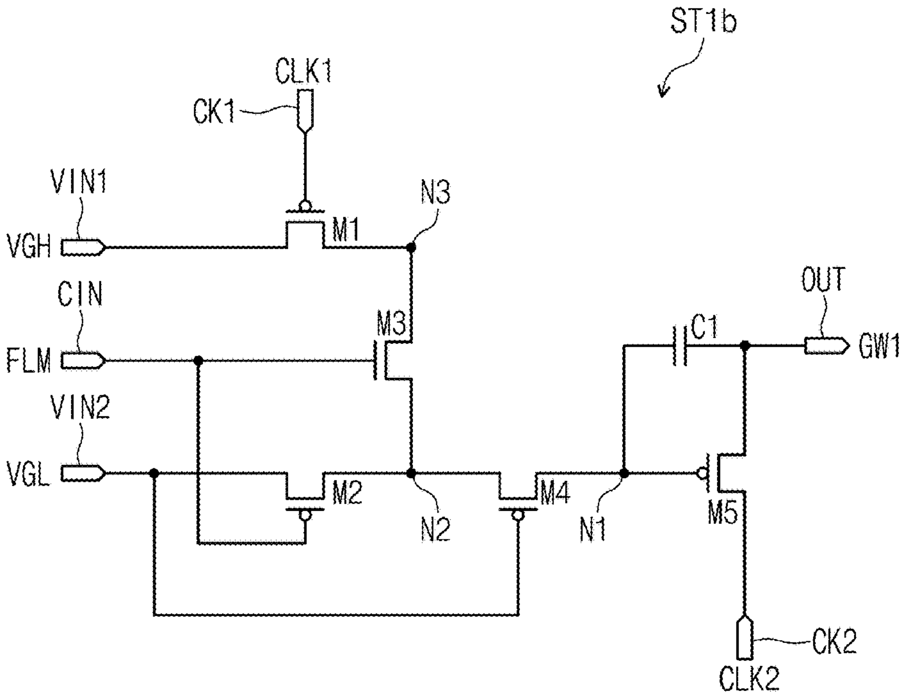
FIG. 12 is a circuit diagram of a driving stage, according to still another embodiment of the present disclosure.

FIG. 12 is a circuit diagram of a driving stage ST1*b*, according to still another embodiment of the present disclosure.

Referring to FIG. 12, the driving stage ST1*b* includes the first to fifth transistors M1 to M5 and the first capacitor C1. The driving stage ST1 further includes the first and second clock input terminals CK1 and CK2, the carry input terminal CIN, the first and second voltage terminals VIN1 and VIN2, and the output terminal OUT.

The first to fifth transistors M1 to M5 and the first capacitor C1 of the driving stage ST1*b* are similar to the first to fifth transistors M1 to M5 and the first capacitor C1 of the driving stage ST1 shown in FIG. 7. Accordingly, the same reference numerals are used for components, which are similar to components in the driving stage ST1 shown in FIG. 7, and additional descriptions are omitted to avoid redundancy.

The fourth transistor M4 of the driving stage ST1*b* includes a first electrode connected to the second node N2, a second electrode connected to the first node N1, and a gate electrode connected to the second voltage terminal VIN2.

The parasitic capacitance may be formed between the second electrode and the gate electrode of the fourth transistor M4. Accordingly, even though the second capacitor C2 of the driving stage ST1 shown in FIG. 7 is not included, the first signal S_N1 of the first node N1 may be maintained at a predetermined voltage level in each of the first to fifth periods P1 to P5 by the parasitic capacitance.

The driving stage ST1 shown in FIG. 7 includes the second capacitor C2. On the other hand, the driving stage ST1*b* shown in FIG. 12 does not include the second capacitor C2.

The driving stage ST1*b* includes the first to fifth transistors M1 to M5, and the first capacitor C1. The circuit area may be reduced compared to the driving stage ST1 shown in FIG. 7.

Figure 13:
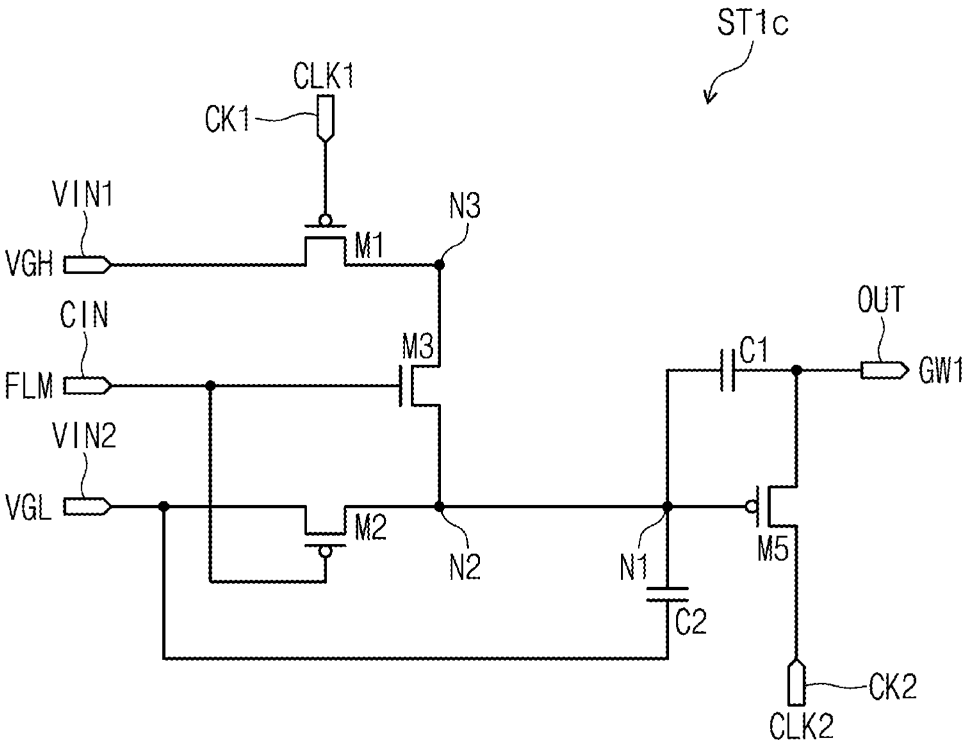
FIG. 13 is a circuit diagram of a driving stage, according to yet another embodiment of the present disclosure.

FIG. 13 is a circuit diagram of a driving stage ST1c, according to yet another embodiment of the present disclosure.

Referring to FIG. 13, the driving stage ST1c includes the first, second, third and fifth transistors M1, M2, M3, and M5, the first capacitor C1, and the second capacitor C2. The driving stage ST1 further includes the first and second clock input terminals CK1 and CK2, the carry input terminal CIN, the first and second voltage terminals VIN1 and VIN2, and the output terminal OUT.

The first, second, third and fifth transistors M1, M2, M3, and M5, the first capacitor C1, and the second capacitor C2 of the driving stage ST1c are similar to the first, second, third and fifth transistors M1, M2, M3, and M5, the first capacitor C1, and the second capacitor C2 of the driving stage ST1 shown in FIG. 7. Accordingly, the same reference numerals are used for components, which are similar to components in the driving stage ST1 shown in FIG. 7, and additional descriptions are omitted to avoid redundancy.

The gate electrode of the fourth transistor M4 of the driving stage ST1 shown in FIG. 7 is connected to the second voltage terminal VIN2, and thus the fourth transistor M4 is always turned on. That is, the first node N1 and the second node N2 of the driving stage ST1 are electrically connected through the fourth transistor M4.

Because the driving stage ST1c does not include the fourth transistor M4, the first node N1 and the second node N2 are directly connected to each other.

The driving stage ST1 shown in FIG. 7 includes the fourth transistor M4. On the other hand, the driving stage ST1c shown in FIG. 12 does not include the fourth transistor M4.

The driving stage ST1c may include the first, second, third, and fifth transistors M1, M2, M3, and M5, and the first and second capacitors C1 and C2. The circuit area may be reduced compared to the driving stage ST1 shown in FIG. 7.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

According to an embodiment of the present disclosure, a scan driving circuit including the minimum number of transistors may be implemented. Accordingly, a circuit area of the scan driving circuit may be minimized. As the circuit area of the scan driving circuit is minimized, the bezel area of the display device may be effectively minimized.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A scan driving circuit comprising:

an input part connected to a first voltage terminal, a second voltage terminal, and a carry input terminal and configured to output a second signal to a second node;

a controller configured to control a first signal of a first node and the second signal of the second node; and a fifth transistor configured to be controlled by the first signal of the first node and configured to deliver a second clock signal to an output terminal, wherein the input part includes:

a first transistor connected between the first voltage terminal and a third node, and including a gate electrode connected to a first clock input terminal; and a third transistor connected between the third node and the second node and including a gate electrode connected to the carry input terminal.

2. The scan driving circuit of claim 1, wherein the input part further includes:

a second transistor connected between the second voltage terminal and the second node, and including a gate electrode connected to the carry input terminal.

3. The scan driving circuit of claim 2, wherein the second transistor and the third transistor are transistors having different types from each other.

4. The scan driving circuit of claim 2, wherein a first clock signal provided to the first clock input terminal and the second clock signal provided to a second clock input terminal have frequencies the same as each other and different phases from each other.

5. The scan driving circuit of claim 4, wherein, during a first period, each of a carry signal provided to the carry input terminal and the first clock signal is at a first level, and the second clock signal is at a second level different from the first level, wherein, during a second period different from the first period, the second clock signal is at the first level, and wherein, during the second period, a scan signal output to the output terminal is at the first level the same as the second clock signal.

6. The scan driving circuit of claim 1, wherein the controller includes a fourth transistor connected between the first node and the second node and including a gate electrode connected to the second voltage terminal.

7. The scan driving circuit of claim 1, wherein a first voltage provided to the first voltage terminal has a higher voltage level than a second voltage provided to the second voltage terminal.

8. A scan driving circuit comprising:

a first transistor connected between a first voltage terminal and a third node, and including a gate electrode connected to a first clock input terminal;

a second transistor connected between a second voltage terminal and a second node and including a gate electrode connected to a carry input terminal;

a third transistor connected between the third node and the second node and including a gate electrode connected to the carry input terminal;

a fourth transistor connected between the second node and a first node and including a gate electrode connected to the second voltage terminal;

a fifth transistor connected between an output terminal and a second clock input terminal and including a gate electrode connected to the first node;

a first capacitor connected between the output terminal and the first node; and a second capacitor connected between the first node and the second voltage terminal.

9. The scan driving circuit of claim 8, wherein a second signal of the second node is determined by turning on one of the second transistor and the third transistor by a carry signal provided to the carry input terminal.

10. The scan driving circuit of claim 8, wherein the second transistor and the third transistor are transistors having different types from each other.

11. The scan driving circuit of claim 8, wherein a first clock signal provided to the first clock input terminal and a second clock signal provided to the second clock input terminal have frequencies the same as each other and different phases from each other.

12. The scan driving circuit of claim 11, wherein, during a first period, each of a carry signal provided to the carry input terminal and the first clock signal is at a first level, wherein, during a second period different from the first period, the second clock signal is at the first level, and wherein, during the second period, a scan signal output to the output terminal is at the first level the same as the second clock signal.

13. A display device comprising:

a display panel including a pixel;

a scan driving circuit configured to provide a scan signal to the pixel;

a driving controller configured to provide a start signal, a first clock signal, and a second clock signal to the scan driving circuit; and a voltage generator configured to provide a first voltage to a first voltage terminal of the scan driving circuit and to provide a second voltage to a second voltage terminal of the scan driving circuit, wherein the scan driving circuit includes:

an input part connected to the first voltage terminal, the second voltage terminal, and a carry input terminal and configured to output a second signal to a second node;

a controller configured to control a first signal of a first node and the second signal of the second node; and a fifth transistor configured to be controlled by the first signal of the first node and configured to output the second clock signal as the scan signal.

14. The display device of claim 13, wherein the input part includes:

a first transistor connected between the first voltage terminal and a third node and including a gate electrode connected to a first clock input terminal configured to receive the first clock signal;

a second transistor connected between the second voltage terminal and the second node, and including a gate electrode connected to the carry input terminal; and a third transistor connected between the third node and the second node and including a gate electrode connected to the carry input terminal.

15. The display device of claim 14, wherein the second transistor and the third transistor are transistors having different types from each other.

16. The display device of claim 14, wherein the second signal of the second node is determined by turning on one of the second transistor and the third transistor by the start signal provided to the carry input terminal.

17. The display device of claim 13, wherein the first clock signal and the second clock signal have frequencies the same as each other and different phases from each other.

18. The display device of claim 17, wherein, during a first period, each of the start signal and the first clock signal is at a first level, and the second clock signal is at a second level different from the first level, wherein, during a second period different from the first period, the second clock signal is at the first level, and wherein, during the second period, the scan signal is at the first level the same as the second clock signal.

19. The display device of claim 18, wherein, during a third period different from each of the first period and the second period, each of the start signal and the second clock signal is at the second level, and the first clock signal is at the first level.

20. The display device of claim 13, further comprising:

a data driving circuit configured to provide a data signal, wherein the pixel includes:

a light emitting element;

a first pixel transistor including a first electrode, a second electrode connected to the light emitting element, and a gate electrode; and a second pixel transistor connected between a data line configured to receive the data signal and the first electrode of the first transistor and including a gate electrode configured to receive the scan signal.

21. An electronic device comprising:

a display panel including a pixel;

a scan driving circuit configured to provide a scan signal to the pixel;

a driving controller configured to provide a start signal, a first clock signal, and a second clock signal to the scan driving circuit; and a voltage generator configured to provide a first voltage to a first voltage terminal of the scan driving circuit and to provide a second voltage to a second voltage terminal of the scan driving circuit, wherein the scan driving circuit includes:

an input part connected to the first voltage terminal, the second voltage terminal, and a carry input terminal and configured to output a second signal to a second node;

a controller configured to control a first signal of a first node and the second signal of the second node; and a fifth transistor configured to be controlled by the first signal of the first node and configured to output the second clock signal as the scan signal, wherein the input part includes:

a first transistor connected between the first voltage terminal and a third node, and including a gate electrode connected to a first clock input terminal configured to receive the first clock signal; and a third transistor connected between the third node and the second node and including a gate electrode connected to the carry input terminal.

* * * * *